(12) United States Patent
Mallard

(10) Patent No.: US 7,059,618 B2
(45) Date of Patent: Jun. 13, 2006

(54) FLUID AUTOMATIC BICYCLE TRANSMISSION

(76) Inventor: Thomas Irvin Mallard, 12063 10th Ave. South, Seattle, WA (US) 98168-2213

( * ) Notice: Subject to any disclaimer, the term of this patent is extended or adjusted under 35 U.S.C. 154(b) by 0 days.

(21) Appl. No.: 10/613,535

(22) Filed: Jul. 3, 2003

(65) Prior Publication Data
US 2004/0118243 A1    Jun. 24, 2004

Related U.S. Application Data

(63) Continuation-in-part of application No. 10/117,624, filed on Apr. 8, 2002, now abandoned.

(51) Int. Cl.
*B62M 1/00* (2006.01)

(52) U.S. Cl. .......................... 280/216; 60/350
(58) Field of Classification Search ............... 280/216, 280/215, 214, 212, 210, 236; 60/338, 350
See application file for complete search history.

(56) References Cited

U.S. PATENT DOCUMENTS

| | | | | |
|---|---|---|---|---|
| 1,540,453 A * | 6/1925 | Arave | ........................ | 60/364 |
| 1,636,050 A * | 7/1927 | Hermann | ..................... | 60/718 |
| 1,786,433 A * | 12/1930 | Klimek | ........................ | 60/349 |
| 1,831,690 A * | 11/1931 | Taylor | ........................ | 60/364 |
| 1,888,881 A * | 11/1932 | Murphy | ....................... | 60/364 |
| 2,010,401 A * | 8/1935 | Kohler | ........................ | 60/331 |

* cited by examiner

*Primary Examiner*—Tony Winner

(57) ABSTRACT

A bicycle hub having a fluid automatic transmission receiving power input from the rider which uses drag to transfer power from an outer shell being rotated by the drive train to a stator and using applied torque to automatically control mechanical advantage in a limited manner by changing drag, this with flow restriction to limit the amount of shear possible thus the device is a fluid couple with torque-converter qualities. The ability to respond to torque in a way that changes mechanical advantage in a manner that the rider considers normal bicycle operation over varied terrain is what makes the device a fluid automatic bicycle transmission. The apparatus is appropriate to small and fractional horsepower applications in general.

5 Claims, 16 Drawing Sheets

Assembled Transmission

A

B

C

D

E

FLUID AUTOMATIC BICYCLE TRANSMISSION

This application is a continuation-in-part of Ser. No. 10/117,624 filed on Apr. 8, 2002 now abandoned.

BACKGROUND

1. Field of the Invention

This invention of a fluid automatic transmission for bicycles relates to several basic hydraulic devices, specifically the fluid couple, the common vane pump or motor and the simple torque-converter.

2. Background of the Invention

Classification: Bicycle, 280/216.000

Related classifications: Class 74, subclass 337, torque responsive reversing or ratio change; 74/730.1, gearing combined with a fluid force torque transmitting device to form a drive train; 74/665, single gearing unit includes a fluid drive; 74/393, transmission with varying speed ratio.

A basic torque-converter concept was the primary theoretical mode for this fluid automatic transmission (see FIG. 2 View 1), where a power input 6, is applied to a surface 4, connected with fluid to an output stator 2, FIG. 2, within a fluid chamber 9, and where the distance in fluid shear between the two View-AA, is controlled in response to changes in torque using springs 3a, thereby changing "slip" or step-down as a means to change mechanical advantage for the rider automatically.

Automatic bicycle transmissions currently available are in general gear shifting devices having torque sensing systems or gyroscopic control for torque or cadence, respectively, to move the chain from sprocket to sprocket as a transmission means. Fluid drives and devices have been designed to include the ability to change mechanical advantage without gearing and without rider input [Satao 1995, 5387000], these qualities defined as being essential to the operation and performance qualities of a fluid automatic bicycle transmission. This important patent by Sato embodies most of the underlying concepts of fluid drives and automatic transmissions.

However, previous automatic bicycle transmissions and fluid drives have significant drawbacks which prevent them from gaining the volume market in bicycles. A most important factor in order for the industry to adopt a fluid drive of any type is the need for the product to be a replacement part and not require any modification to a typical modern bicycle with multiple speed cassette or freewheel and some type of sifting device. Therefore, this fluid automatic bicycle transmission was intentionally designated to replace existing bicycle gearing of any standard type including single-speed freewheel replacement, cassette of sprockets replacement, cassette freehub body replacement, standard freewheel multi-speed replacement (see FIGS. 5A–D). Also, these same parts are functionally applied internally to the hub body for the embodiment (see E, FIG. 5, FIG. 16) that replaces existing hubs.

The concept of an automatic transmission using a fluid to transfer power for bicycles has been considered for some time with a refined practical embodiment using a variable displacement pump and fixed displacement motor to change mechanical advantage in response to pressure changes directly related to changes in rider torque by Sato in the 1990's.

However, this fluid automatic bicycle transmission is not a positive displacement device so diverges from prior art on the method of transferring power using fluids. This transmission applies concepts found among the fluid pump/motors in Class 415, Subclass 89, [Sharpneck 1883, 271139, Budrys 1981, 4251184], along with principles from Class 475, Subclass 94, [Taylor 1935, RE020988] as this fluid automatic bicycle transmission uses drag as the primary means to transfer power, rotation of the outer shell as the functional equivalent to an impeller and wherein a functional equivalent to a stator of vanes and springs can be used to react to rider input torque by altering drag thereby changing mechanical advantage in a limited manner. Using drag as the primary means to transfer power is a crucial difference from prior art in small and fractional horsepower rated transmissions that results in important advantages.

To adapt easily as a replacement part to bicycles and other small horsepower applications using existing bicycle parts the transmission must fit on existing bicycle hubs and especially important of these are the cassette replacement FIG. 5-A, multi-speed freewheel replacement FIG. 5-C, and single-speed freewheel replacement FIG. 5-D, and, any such device must use a basic hollow geometry limited in width by the distance between the hub flange, spokes or rim support, and the frame (see Inset FIG. 1). The hub replacement FIG. 5-E, has the advantages of being less exposed to weather and abrasive road grit and also having cassette type cog replacement, and, all embodiments are fully serviceable using common bicycle industry tools.

For this class of device design focus is on the ability of the transmission to respond to torque with changes in mechanical advantage in a manner that the rider considers automatic transmission operation over varied terrain. Bicycle and other human powered vehicle ridership can be separated into groups by weight and aggressiveness in order to inventory fixed geometry transmissions tuned and adjusted to these groups, or, for racing a method to change spring compression is used, said tuning consisting of appropriate spring and recovery rates, viscosity and maximum flow constraints to allow a practical product to satisfy the variety of human powered transportation needs weather recreational, racing or utility.

A fluid automatic bicycle transmission uses a bicycle crankset with pedals 16c having a single front chainring sprocket 16b, and having a chain 17, all supported by a bicycle frame 21, and having a rear hub 12, having a fluid automatic transmission which is a replacement for existing gearing, said chain can deliver power to a rear sprocket 6, connected using threads or other means to an outer shell 4, of said transmission having a fluid chamber 9, said outer shell separated from an inner shell 1, by a pair of bearings 7a–7b, and sealing means 5a–5b, so that as said outer shell rotates, drag caused by this motion within said fluid chamber accelerates the fluid which accelerates said inner shell by dragging said stator affixed to said inner shell within a closed fluid system to transfer power. The geometry shown in FIG. 2-B illustrates a basic fluid couple device using drag to transfer power. This type of device operates at a higher efficiency than positive displacement devices by having all bearing and seal friction add to output power yet loses a portion of this advantage to heat generation during high step-down conditions, the variance of the human pedal stroke attenuating these heat losses.

Another significant difference from prior art is that a positive displacement pump has a loss of output power from slip and must concern itself with precision seals and tolerances thus increasing cost of manufacture and a loss of efficiency as pressure goes up and as usage wears these surfaces down, whereas for the drag device slip is a means to change mechanical advantage without a significant loss of power for this as pressure being negative or suction, instead losses relate to heat generated by stepping down the ratio, and, said drag device's internal paths need not touch, thus wear is minimal and performance is less affected over time than positive displacement devices. Having these advantages, slip only needed be reduced to a practical level so that the rider perceives "high gear" as minimum slip FIG. 3-B, with a range of change in mechanical advantage ending with what the rider perceives as "low gear" where slip is greatest FIG. 3-$B_2$. The rider's cadence is stepped up by the front chainring sprocket 16$b$, having more teeth than the rear sprocket 6. As step-down by the transmission increases with applied torque the mechanical advantage is increased until the powered wheel and cadence are approximately 1:1 for a normal "low gear" of said transmission for average cyclists; note that recumbent and many utility human powered vehicles require as low a ratio as 1:2 for "low gear".

These major differences are derived from rotating the housing 4, [Budrys 1981, 4251184], using drag to transfer power with a fluid, [Sharpneck, 1883, 271139], and then to use torque to change dimensions of the shear zone thus changing drag as the means to change mechanical advantage for the rider without any other rider input for automatic operation while the racing market will demand a means to change how easy it is to get to "low gear" that is rider actuated.

Such automatic devices have distinct performance differences from a chain drive with multiple sprockets, among these is prominent the distinction that as the rider adds more power the mechanical advantage is reduced. As the terrain changes, then, the transmission acts as a torque limiter up to a point, then the transmission becomes a fluid couple and no longer allows any change to mechanical advantage while going up a hill, and, when terrain is nearly level or downhill, the device will change until the minimum slip condition is reached. If there is no hill and the rider adds more power the device reacts after dampening with a lower gear ratio, then as the riders continues to accelerate their high torque eventually becomes less per stroke as the acceleration is reduced and the device automatically compensates this by raising the mechanical advantage; the rider can thus control the mechanical advantage consciously from the way they use changes in torque while pedaling. Therefore, this device while not requiring conscious and perceptive use by the rider can be used by a perceptive rider to change mechanical advantage consciously or intentionally.

At human power ratings the total losses in power transfer for this fluid transmission is very little at low power inputs and approaches 96% efficiency for an average rider losing little to heat generation, yet, if a steady and high torque input is applied the transmission operates at maximum step-down and loses significant energy to heat generation if run for long periods in this manner.

At rates of output typical for casual riders continuous power output is approximately 150-watts with a cadence of 40–60 rpm. Because of this low cadence and power output the clearances of the shear zone and total flow within the device must be limited else there will be too much fluid for the rider to energize and power will not transfer in a practical manner to the inner shell.

FIG. 3 illustrates the change in clearances $B_1$, $B_2$, and $B_3$ between the stator 2, and outer shell 4. To change drag in response to torque, springs 3$a$, are compressed by flow pressure and drag against the vane 3$b$, thus increasing the clearance between said vane and said outer shell until fully open where there is a maximum clearance FIG. 3-B, $B_2$, and FIG. 3-C, $B_2$, thus attaining maximum flow and step down or slip this condition being defined as "low gear" for this type of transmission. In FIG. 3-B, $B_3$ is illustrated the stator cross-section along with the fluid chamber formed by the clearances between said stator, vane, sealing means and outer shell, this area perpendicular to the general flow path said flow turbulent and complex.

To best satisfy rider preferences, changes in vane position can be dampened or slowed to relate to human cadence ranges else the mechanical advantage will change instantly and the ratio would go from a higher to a lower ratio and then back for each revolution of the crankarms.

In the mechanical stator (see FIG. 12), the vane 3$b$, is mounted onto a piston 3$c_1$, which supports said vane and which is structurally attached to said stator body perpendicular to the stator face it is threaded into and directionally towards the flow. The vane is bored for this support piston for said bore to act as a cylinder, said vane body drilled with a small port $C_{11}$, FIG. 12, and thus the support piston must pump fluid through said port in order for the vane to move being immersed thus dampening any motion said dampening performance tuned by the size and number of ports or restrictions, including flow directional control for asymmetric response so that dampening will be more or less depending on the direction of flow through the dampenng circuit, this all is part of the scope of performance related attributes for any mechanical vane dampening system which are easy to turn by changing viscosity or spring strength or the number of vanes used. For example, five vane positions are illustrated in FIG. 12, yet a small child may only require one vane with light springs while the very large person will require all five vanes with heavy springs. The figures in addition to illustrating a mechanical dampening system 2$a$, FIG. 4, also illustrate another system that uses a composite stator 2$b$.

A composite stator (see FIG. 11), can function similarly to mechanical stators from engineered spring and dampening qualities formed into the materials using plastics, amendments and structural shapes from metallic spring materials, said shapes also affecting drag characteristics by their geometry as it relates to flow paths especially bound vortices which can be manipulated to alter drag. Composite stators offer good economy for performance gained. Due to the slow recovery properties of plastics, vane construction can include metallic springs attached to the stator body before injection molding completes the vane to enhance the ability of the vane to fully recover, thus the stator is a composite using metals and plastics to attain optimum performance. However, plastic vanes without metallic springs are adequate for most utility uses.

SUMMARY

The fluid transmission is an effort to develop an automatic transmission for bicycles that was a replacement part for standard sprockets and that was relatively inexpensive. The inventor was familiar with the simple torque converter and hydrostatic drive and viewed it as a theoretical model so began to apply that to human powered vehicles as a transmission that is able to change mechanical advantage by changing drag in response to changes in torque using the attributes of springs and drag surfaces within a closed fluid system.

The main drawback of solely using a fluid for power transfer in automobiles is that the energy losses from heating the fluid at such high horsepower ratings are prohibitive. This at first was an issue. From research it was found that human power output is so variable during the pedal stroke that such energy losses from generated heat caused by turbulence formation within the fluid are not an issue for this type of transmission to reach the mass market and can be attenuated for racing and other performance markets. The torque converter is based on a simple basic fluid transmission that alters the shear zone thickness with a fluid couple in response to applied torque with increases in torque driving the two surfaces apart by the turbulence having increasing energy thus thickening as more power is applied and this compressing the spring allowing the drag surface to move; this all changing the overall step down or slip of the transmission.

To be a replacement part, a most sensible method is to have the chain rotate the outer housing to transfer power, this concept came after the early design sketches with functional parts closely resembling simple forms of a torque-converter having a conical impeller moveable against a spring for changing drag between a similar stator cone. In late April 2001 the current configuration of bearings, inner shell, outer shell and stator were used in design drawings for the first time.

For economy and simplicity it seems best to choose fluids to change mechanical advantage in response to changes in torque instead of physically shifting individual sprockets. The sprockets, derailleurs and shifters required for most contemporary transmissions are simply many times more expensive to make than a fluid automatic transmission. The torque converter of course is able to change slip in response to torque and in a bicycle transmission changes in slip will alter the mechanical advantage of the system and therefore the design problem was to create a torque converter mechanism that can be used with a standard bicycle hub and tune performance so that a rider considers the transmission functional.

A first theoretical prototype was constructed and ridden to establish basic performance concerns. From these discoveries the mechanical vane stator was designed to use a piston rod to support the vane itself and then have a small port to thus create a means to dampen the spring reaction time and slow it such that it relates to human cadence. To give refined control of dynamic response with the composite stator, vane shape can be altered to affect the bound vortex enclosed between vanes as well as the stiffness and recovery rate using common plastics, amendments and related injection molding equipment. Using the properties of this type of drag from flow bound to vane shape for additional means to induce drag beyond simple expansion of the clearance is not available easily to a mechanical vane device. The composite stator design has many advantages over a mechanical vane stator, prominently it has an economy for performance gained from ease of manufacture and the ability of the composite materials to handle larger torque loads such as for tandems and pedicabs.

BRIEF DESCRIPTION OF THE DRAWINGS

The drawings render the Fluid Automatic Bicycle Transmission for the main types of hubs used in contemporary bicycles in five embodiments: Cassette Replacement, Cassette Body Replacement, Freewheel Replacement, Single Speed Replacement, and Bicycle Hub Replacement illustrated by these drawings for underlying concepts and understanding the embodiments with the accompanying drawings in which.

Repeated numeric references correspond to functionally equal parts throughout the drawings.

DETAILED DESCRIPTION OF THE INVENTION

Figure 1:
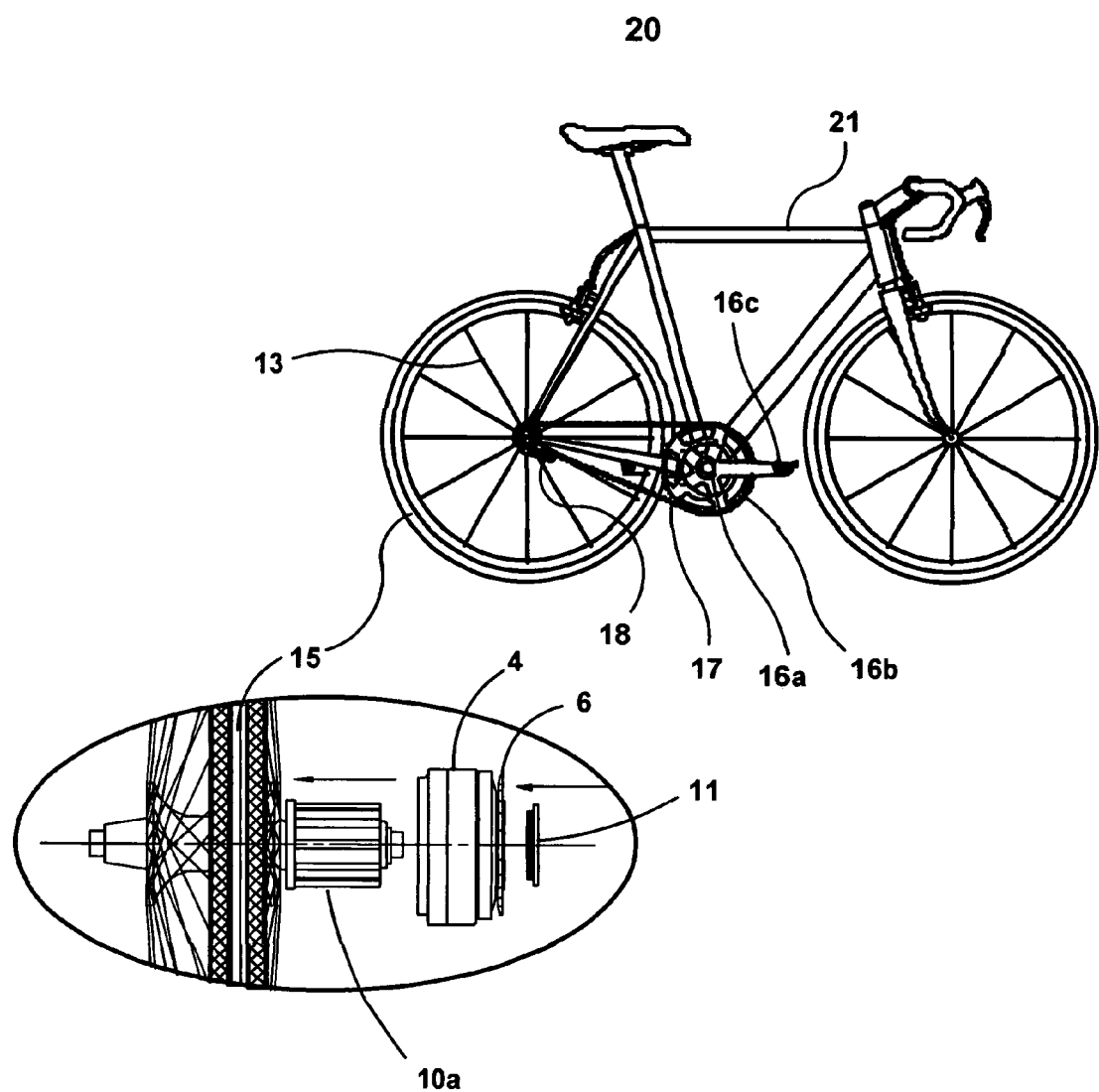
FIG. 1 is a bicycle side elevation view with inset of a fluid automatic bicycle transmission replacement for cassette sprockets being installed using a lock ring.
Figure 2:
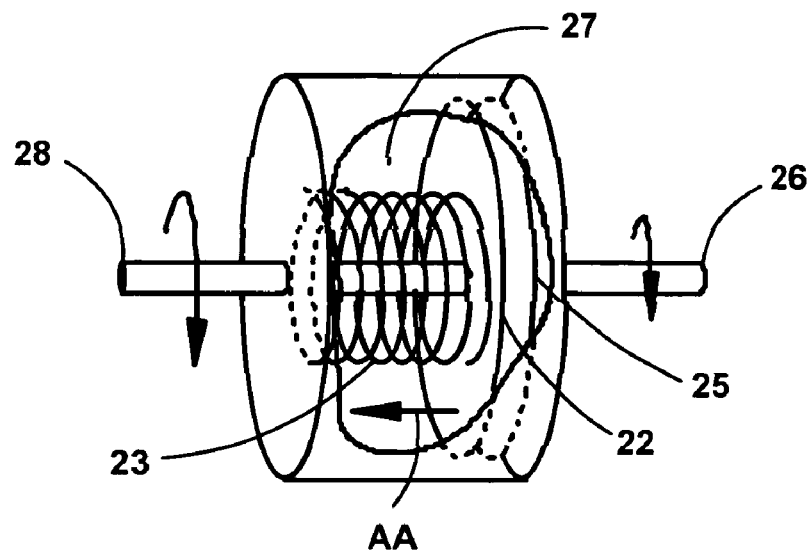
FIG. 2 are overview conceptual drawings of prior art related to small fractional horsepower fluid automatic transmissions.
Figure 2:
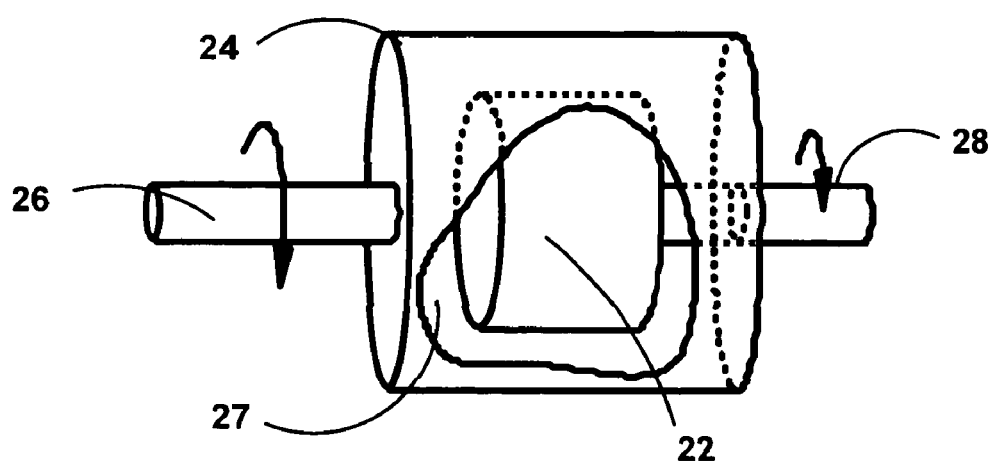
Figure 15:
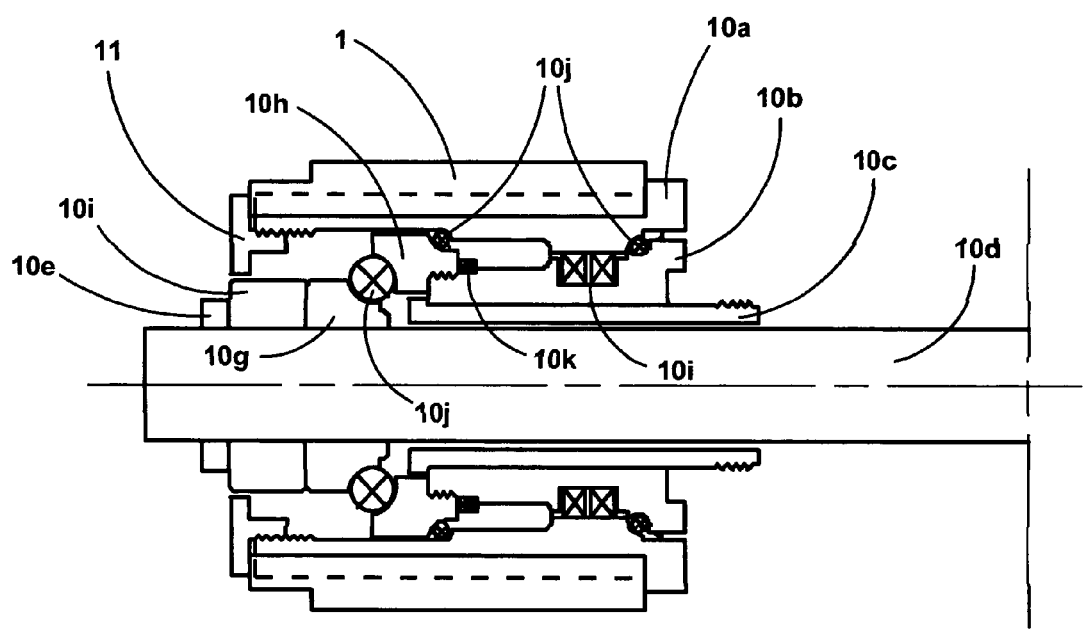
FIG. 15 is a detailed cross-sectional view that identifies parts common to all embodiments.

A bicycle 20, FIG. 1, having a standard crankset 16a, and chain 17, wrapping a front chainring 16b, transferring tensional force to a hub body 21, having a new invention titled "Fluid Automatic Bicycle Transmission" comprised of a sprocket 6, being pulled by said chain from applied tensional force or other power transfer means as input power to the rotate an outer shell 4, supported by a wheel-side bearing 7a, having seating means 5a–5b, of o-rings closely confined by structural surfaces, having a stator 2, having drag varying means (see FIGS. 3, 11 and 12), a drive-side bearing 7b, and an inner shell 1, said transmission having filling means 8, and having been filled with an appropriate fluid such that power is transferred from said sprocket and said outer shell to said inner shell within the closed fluid system, said inner shell fixed using a lock ring 11, onto an outer freewheeling body 10a, on any contemporary bicycle freehub design, said freewheeling outer body supported by ball bearings 10j, FIG. 15, bearing cones 10g, affixed to an inner freewheeling body 10b, supported by bearing cones 10h, affixed to an axle supported by the bicycle frame 21, FIG. 1; said inner and outer freewheeling bodies having pawl races, pawls and retaining means 10i, FIG. 15, to only allow freewheeling rotation in one direction without which reversing the direction of flow within the transmission results in power transfer.

Figure 5:
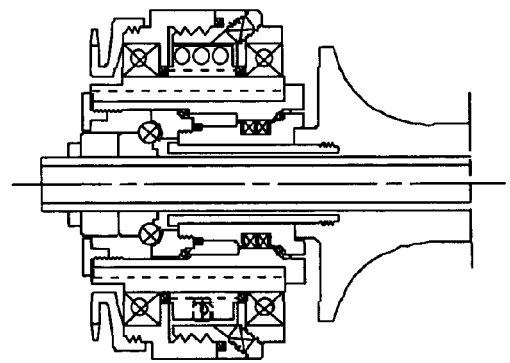
FIGS 5A–E present cross-sectional views of the five basic embodiments.
Figure 5:
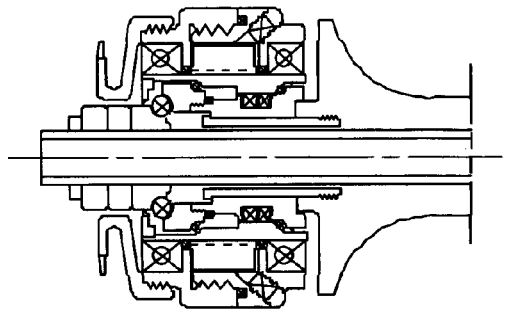
Figure 5:
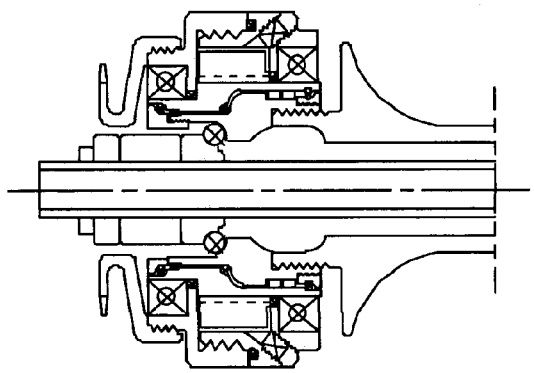
Figure 5:
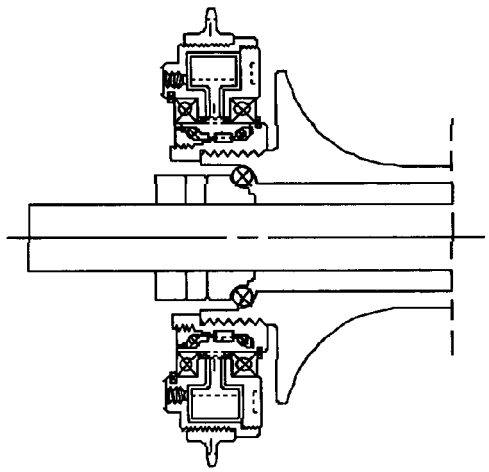
Figure 5:
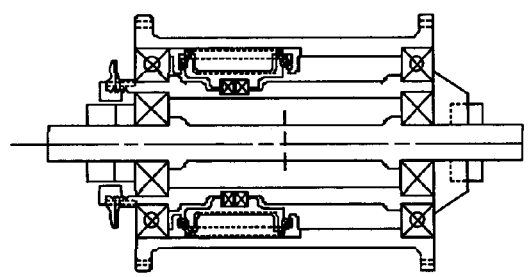
Figure 10:
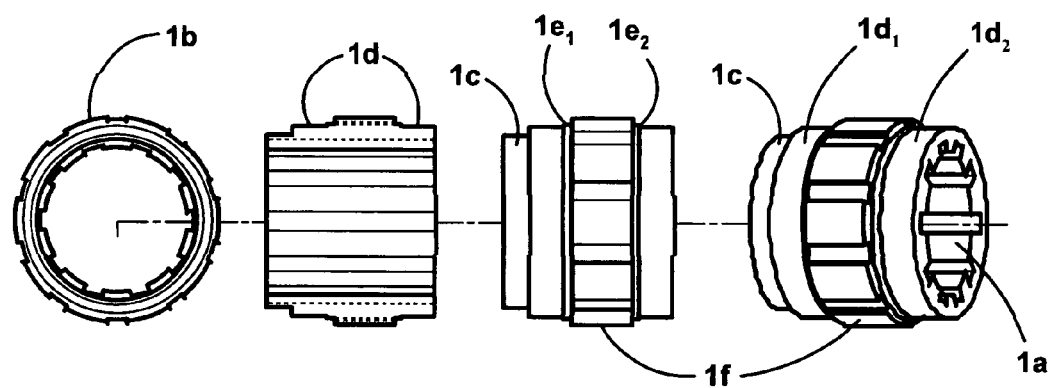
FIG. 10 presents plan, elevation, cross-sectional and isometric views of the inner shell.

The inner shell 1, FIG. 10, begins with hollow round stock extruded or machined with inner splines 1a, to fit the industry freehub cassettes (see A, FIG. 5), as a replacement for the standard sprockets; said inner shell is cut to a width able to use said lock ring to affix said transmission to a standard bicycle cassette freehub body, said inner shell with a step 1*d*, FIG. 10, machined for a drive side bearing 7*a*, using a slip-fit tolerance, and, said inner shell having machined steps for sealing means 1*e*, on each side of a splined step 1*b*, for said stator to engage said inner shell; then, a stored bearing step 7*b*, on the wheel side for said wheel side bearing using a slip-fit tolerance such tolerances allowing the transmission to be serviceable, can be press-fit; and having an outer shell 4, comprised of two pieces 4*a*–4*b*, machined or otherwise formed and which can thread together or be otherwise joined to accept said inner shell with sealing means with said stator, drive side o-ring, then, the drive side bearing 7*a*, is installed into a drive side outer shell 4*a*, tight against a flange 4$_1$, that limits bearing travel and adds a contact surface for said sealing means 5, said inner body with said sealing means and said bearing is then installed onto said inner shell, said stator then installed, said wheel side sealing means 5*b*, is then installed; having a sealing means installed to seal said outer shell halves 5*c*; said wheel side bearing 7*b*, is installed into said wheel side outer shell 4*b*, then threaded or otherwise attached to a drive side outer shell thus to make contact with said wheel side outer shell flange 4$_1$, and sealing means 5*b*, and having two filling holes, drilled and threaded for plugs 8$_a$–8$_b$, to complete a fluid chamber 9, said chamber filled with an appropriate fluid through said filling holes and sealed using said plugs to complete a closed fluid system making said transmission operational, with fluid viscosity affecting performance.

Figure 7:
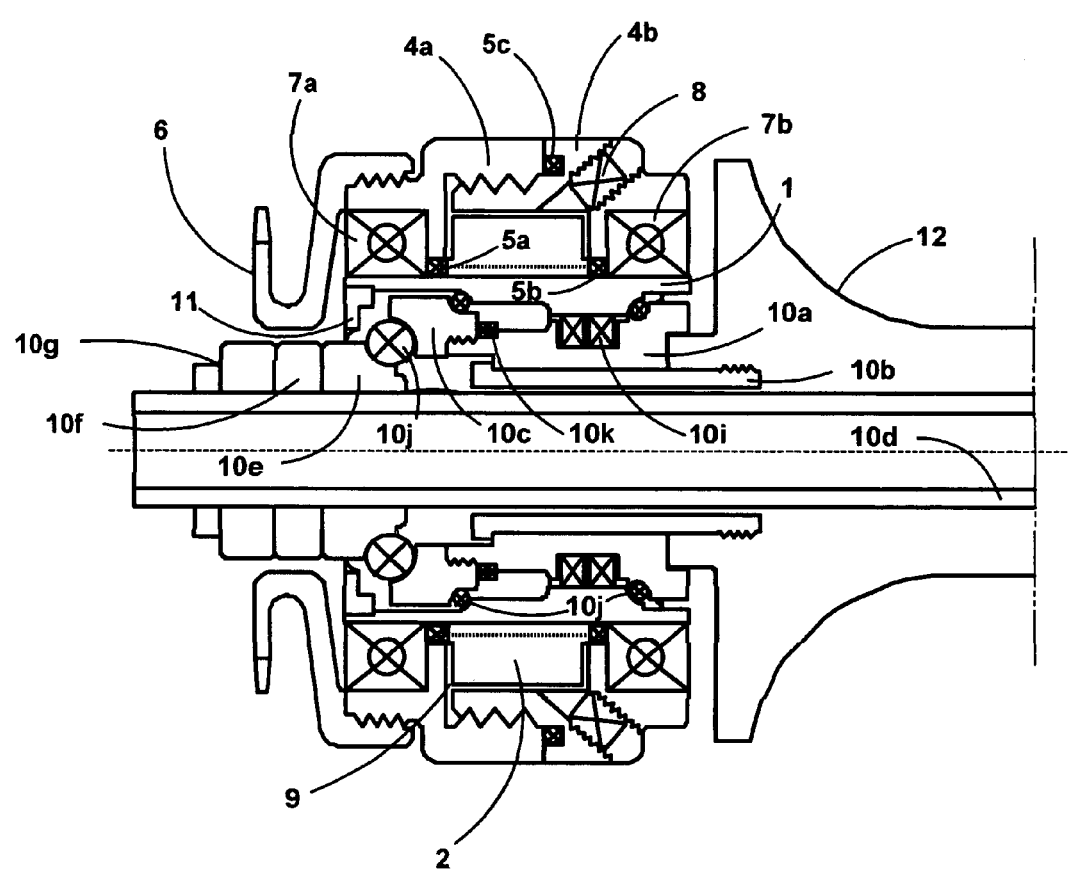
FIG. 7 is a detailed cross-sectional view of the $2^{nd}$ embodiment.
Figure 8:
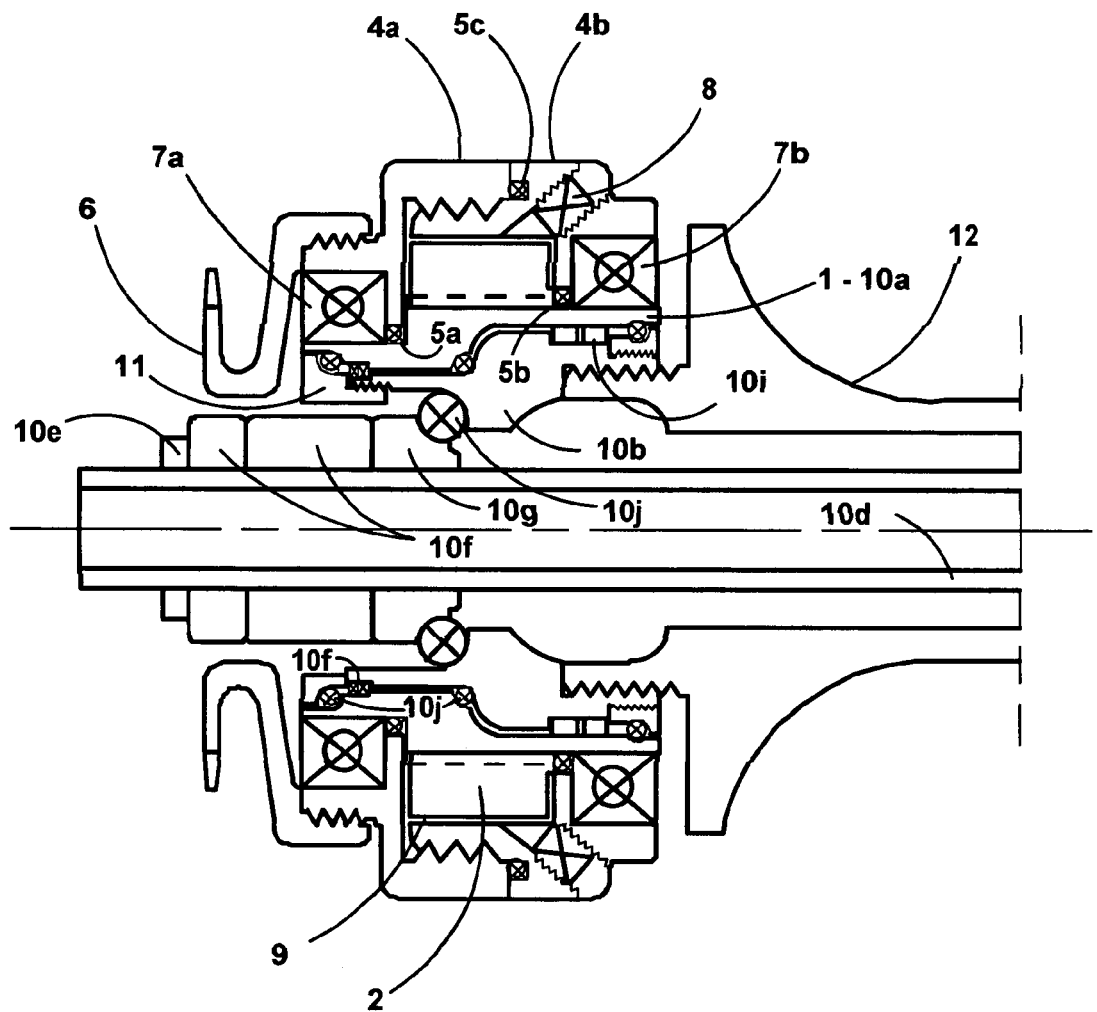
FIG. 8 is a detailed cross-sectional view of the $3^{rd}$ embodiment.
Figure 9:
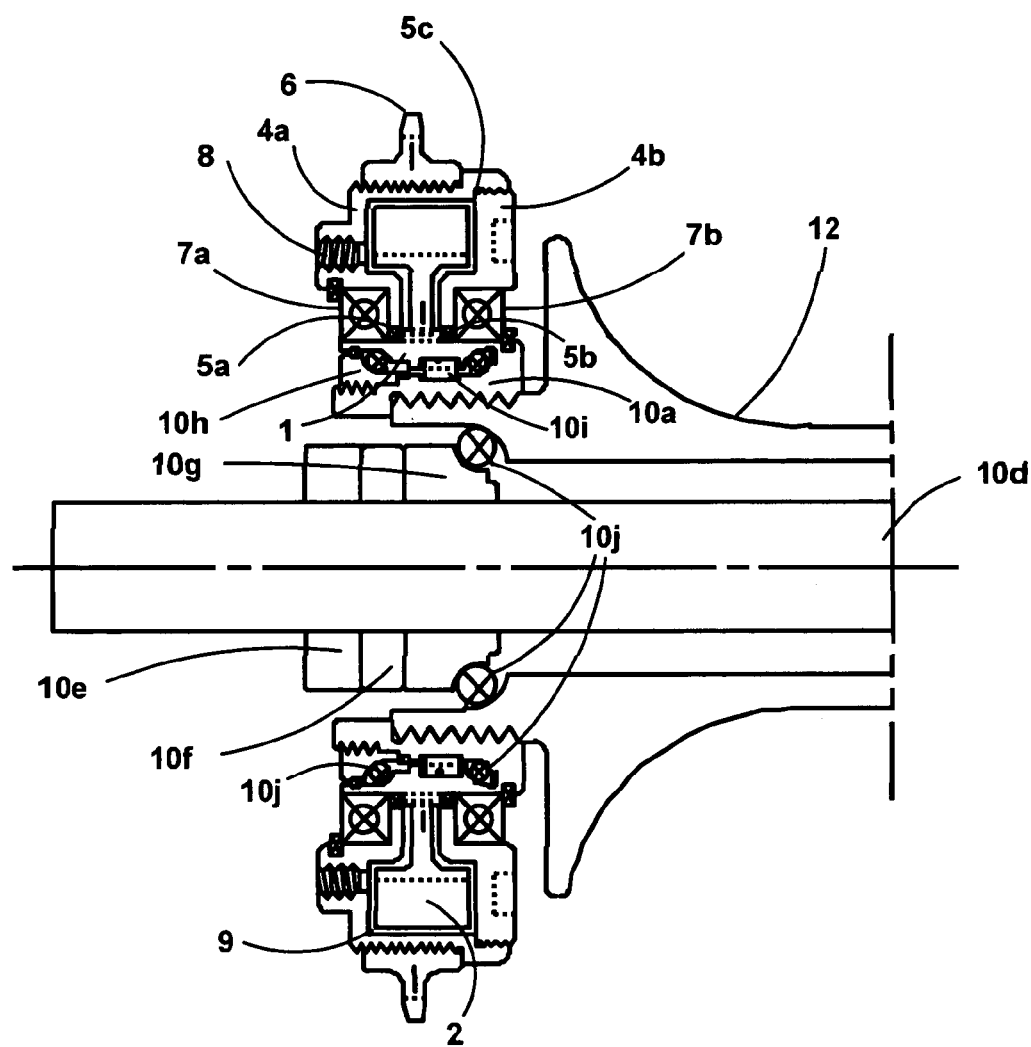
FIG. 9 is a detailed cross-sectional view of the $4^{th}$ embodiment.

Said transmission, can also be embodied to replace the hub cassette body FIG. 7, and therefore bolt to the hub using the standard 10 mm hollow bolt 10*b*, such configuration allowing a 9-tooth drive sprocket this being a significant advantage in performance. A third embodiment replaces the contemporary standard multi-speed freewheels FIG. 8, and a fourth embodiment replaces single speed freewheels, FIG. 9, these embodiments having many parts with common functions (see FIG. 15), for example: Axle bearing cones FIG. 7, 10*g*, axle lock nuts 10*e*, spacers 10*f*, freewheeling pawl races and the pawls with their spring/retainer 10*i*, outer and inner freewheeling body 10*a*–10*b*, ball bearings 10*j*, and bearing adjustment washers 10*k*. In these embodiments the freewheeling body or structure that the standard sprockets of an existing cassette or freewheel are affixed to is modified to accept inner and outer bearings, a stator with sealing means between them and said inner and outer body to create a fluid chamber, having a single sprocket affixed to said outer shell to power the transmission from rider input. The hub replacement embodiment FIG. 16, uses similarly functioning parts with the addition of an input shaft 6*b*, to transfer input power internal to the hub where a freewheeling body applies power to the part functioning as an "outer shell" 4, having two sets of caged bearings 7*b*, 7*c*, for axial alignment allowing said outer shell flanges to be used with said sealing means to create a fluid chamber having filling means and having a stator structurally fitted to an inner shell that is also the hub body in this embodiment.

Figure 3:
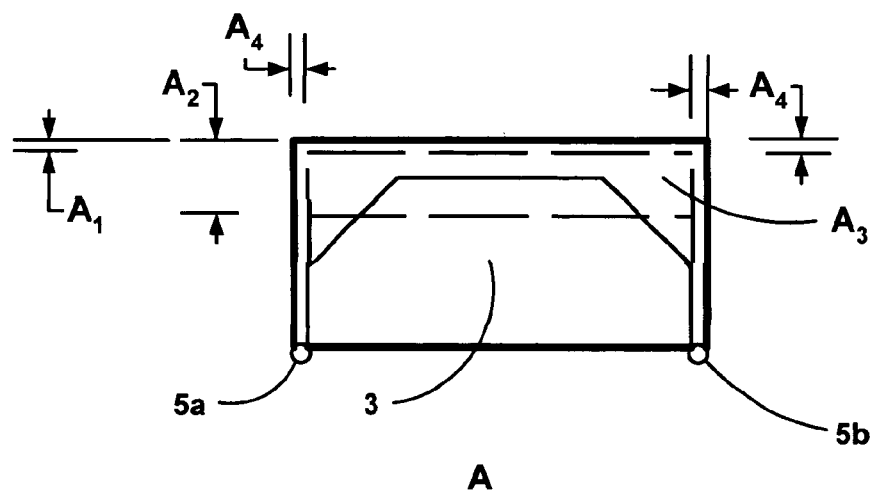
FIG. 3 illustrates how the fluid automatic transmission changes drag in response to changes in the rider'applied torque.
Figure 3:
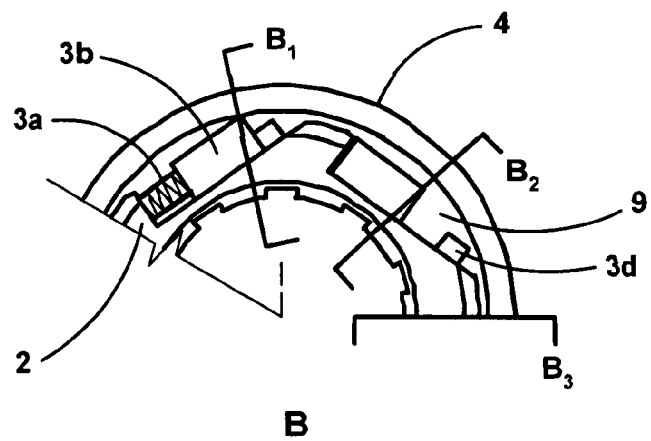
Figure 3:
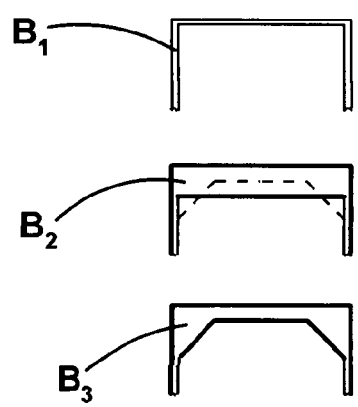
Figure 4:
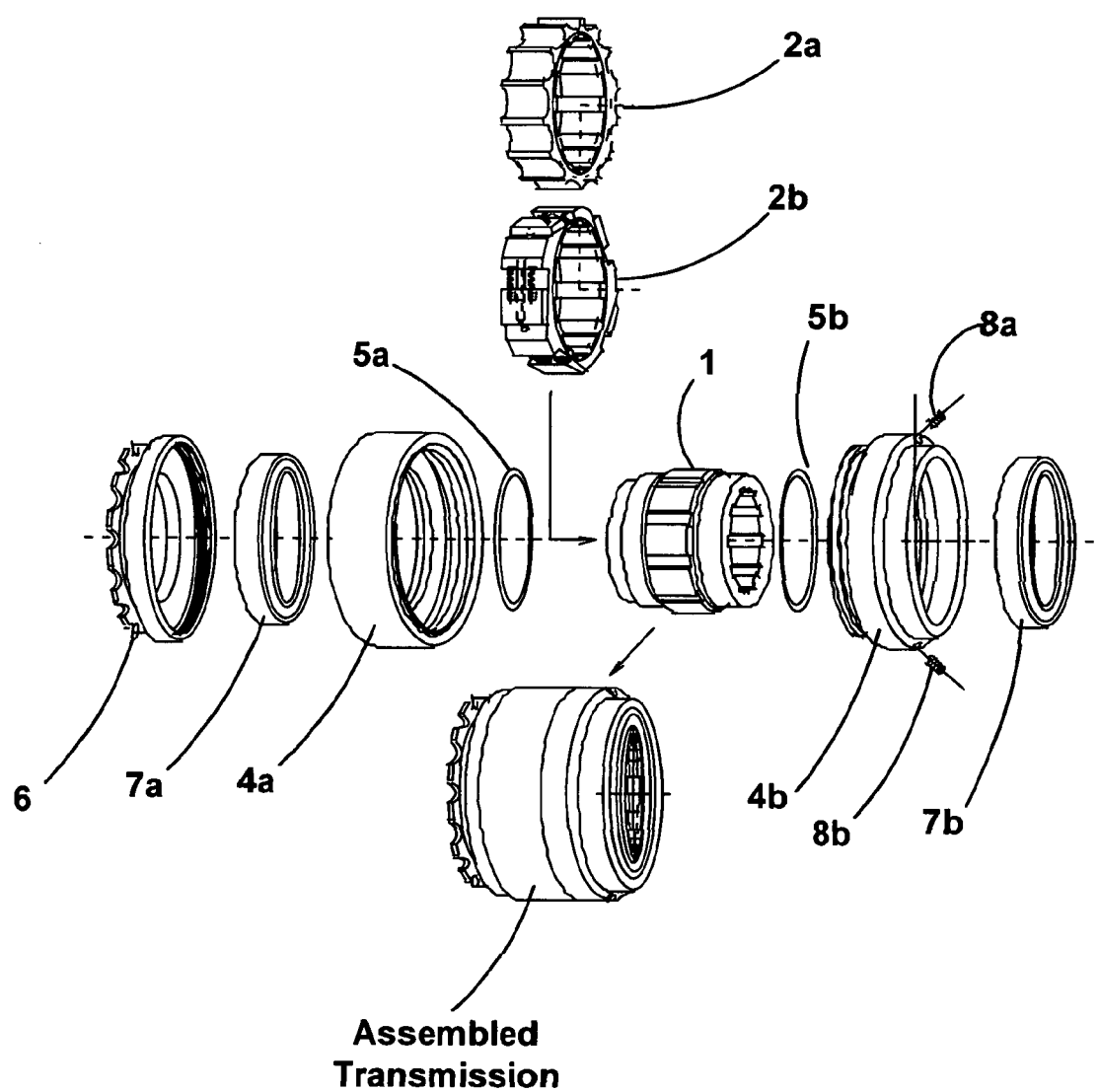
FIG. 4 is an expanded view of parts required to construct said transmission.
Figure 6:
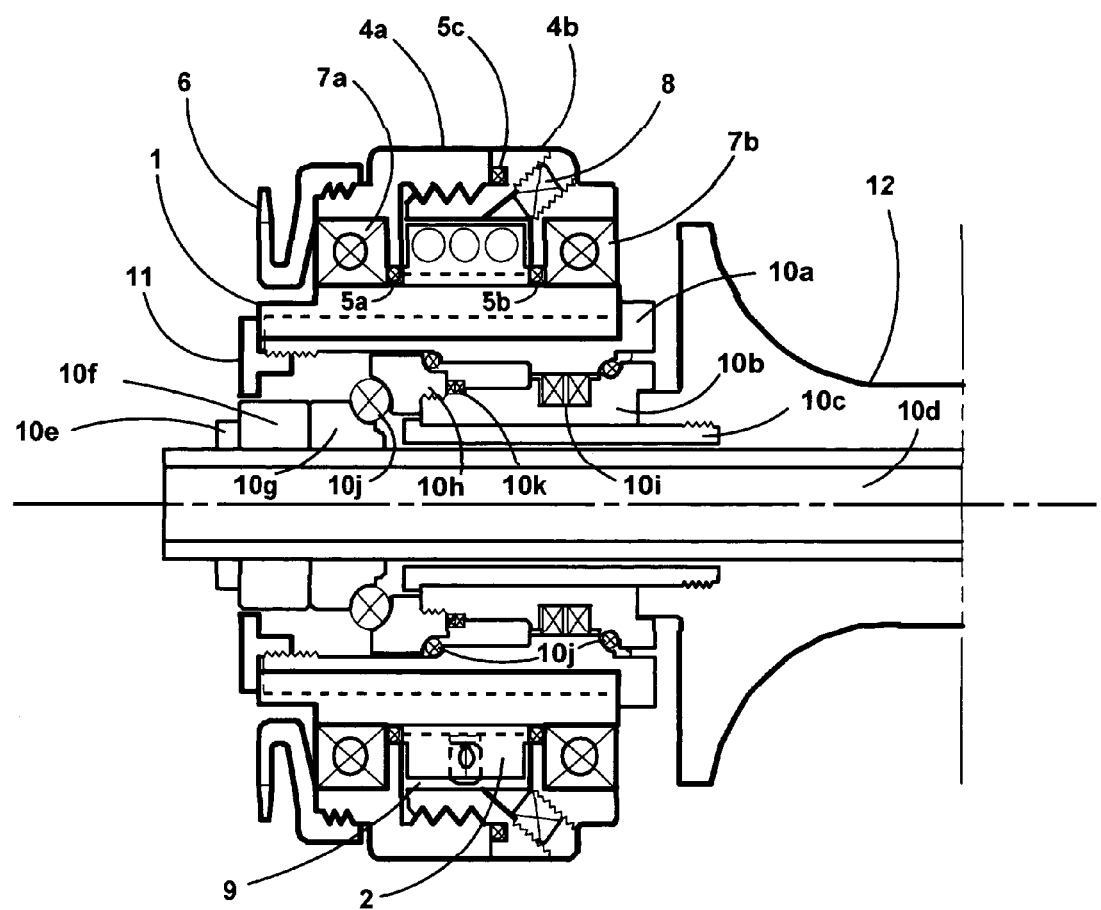
FIG. 6 is a detailed cross-sectional view of the $1^{st}$ embodiment.
Figure 13:
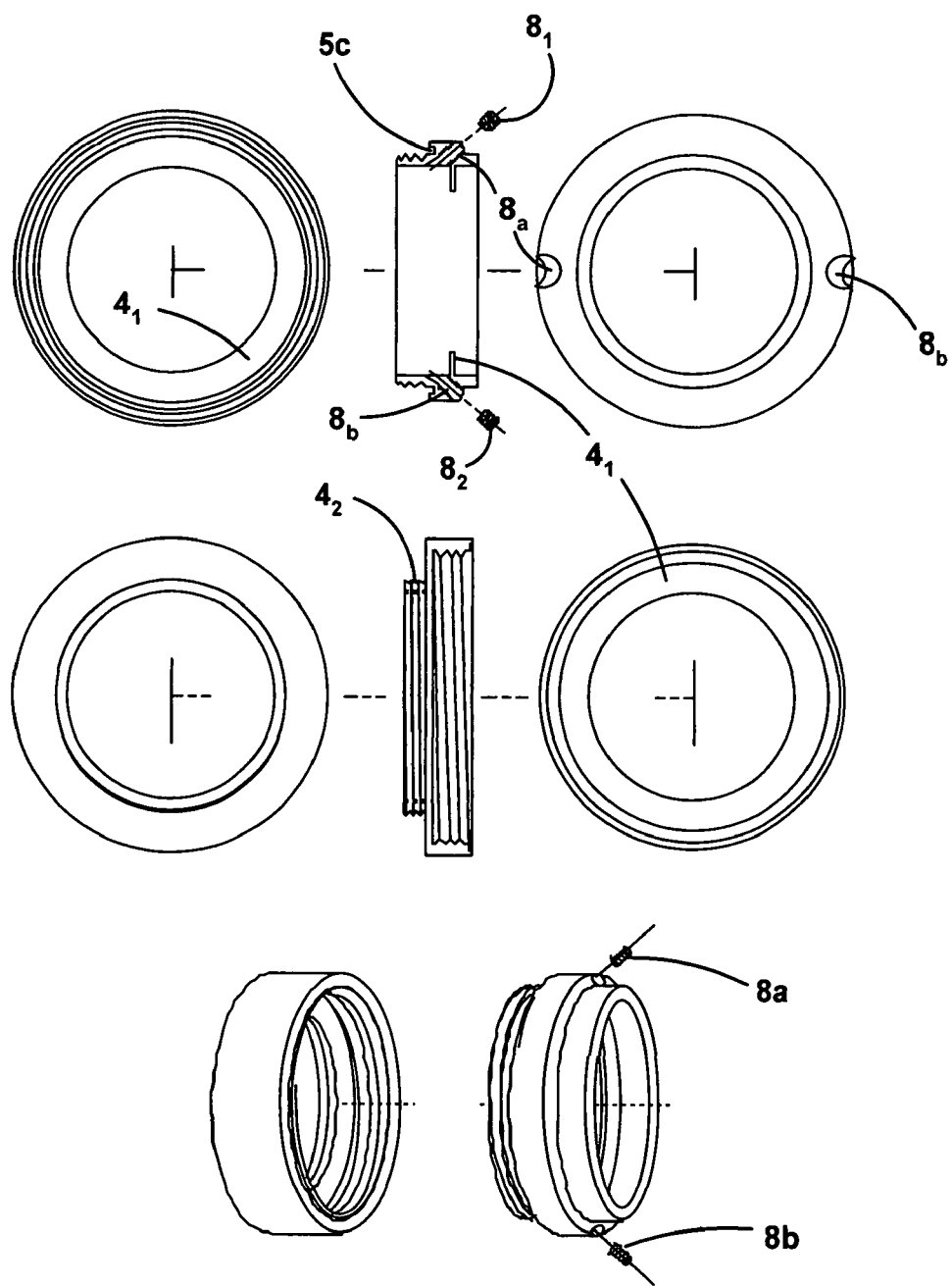
FIG. 13 presents plan, cross-sectional and isometric views of the outer shell and fill plugs.
Figure 14:
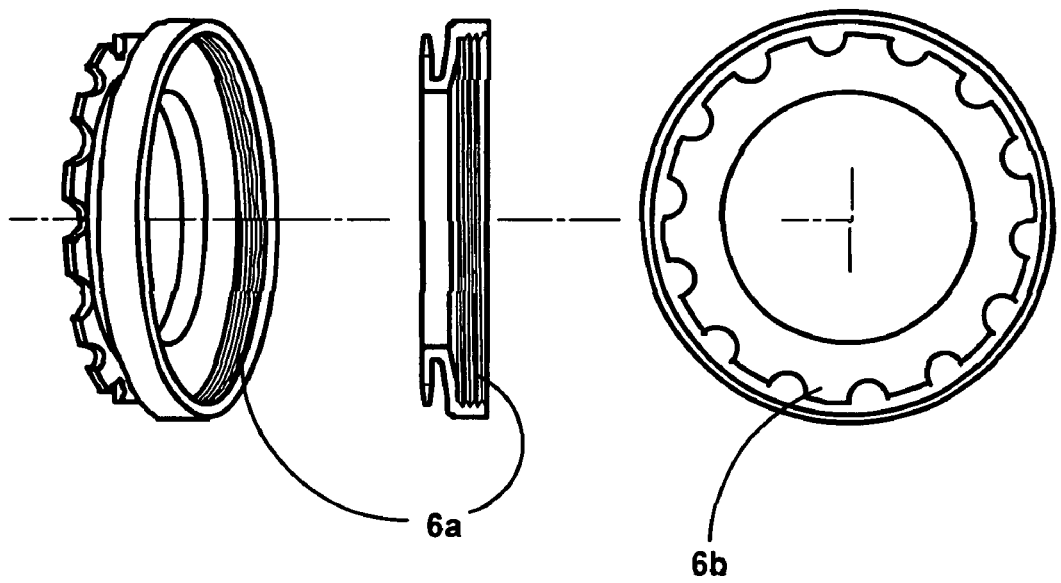
FIG. 14 presents plan, cross-sectional and isometric views of the drive sprocket.

Power is transmitted from a crankset 16*a*, FIG. 1, using a standard bicycle chain 17, to said sprocket 6, using threads, 6*a*, FIG. 14, to be structurally fixed to said drive side outer shell 4*a*, FIG. 4, by the threading shown as 4$_2$, FIG. 13, for a replaceable sprocket, or by splines or other fixing methods to said drive side outer shell, having a flange 4$_1$, abutting the bearing seat and bearing 7*a*, FIG. 3, to create a fluid barrier using an o-ring 5*a*, FIG. 4, to seal the fluid chamber 9, FIG. 6, such geometry chosen to reduce possible leak points to a minimum and to self-lubricate the seal with said fluid, said wheel side outer shell having an identical flange also identified as 4$_1$, FIG. 13. Said wheel-side bearing 7*b*, FIG. 4, is slip-fit into said inner shell bearing step 1*d*$_2$, FIG. 10, and to slip-fit to said wheel side outer shell 4*b*, FIG. 4, creating a void from clearances A$_1$, A$_2$, A$_3$, and A$_4$ once assembled between said bearings 7*a*–7*b*, outer shells with flanges 4$_1$–4$_2$, FIG. 13, the sealing means of o-rings 5*a*–*b*, FIG. 4, stator 2, inner body 1, and having filling means having plugs 8*a*–*b*, to complete a fluid chamber which is a closed fluid system.

Figure 16:
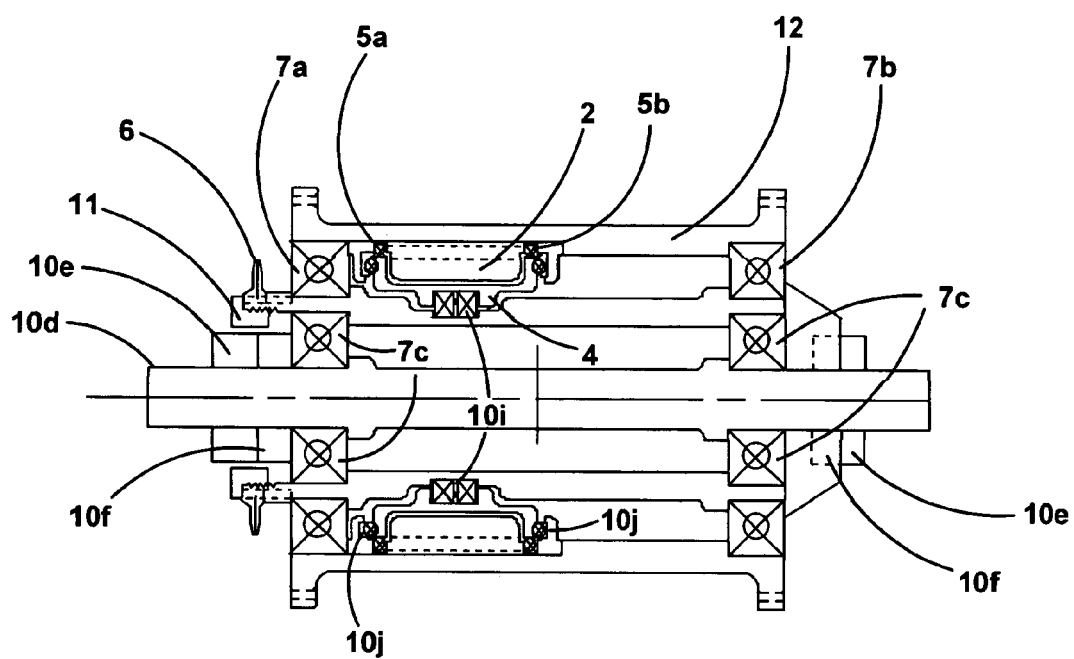
FIG. 16 is a detailed cross-sectional view of the $5^{th}$ embodiment.

Said hub embodiment using similarly functioning parts with additional bearings 7*c*, FIG. 16, to isolate the input shaft 6*b*, creates a fluid chamber in a similar manner between the pawl outer body (which is also the outer shell in this embodiment), and the stator 2, seen in cross-section.

Vanes 3*b*, FIG. 3, are used to regulate drag, by controlling the clearance between said vane and said outer shell as illustrated using the mechanical vane assembly with A$_1$, A$_2$, and A$_3$, using spring qualities of the vane in composites or actual springs to hold the vane against the flow thus transferring power by such resistance as increased drag. At rest the springs 3*a*, keep the vane clearance to a minimum B, B$_1$, a stop seen in 3*d*, FIG. 12, prevents the vane from actual contact with said outer shell in the mechanical vane stator, stator vane embodiments having an initial resistance or preload that must be overcome to enlarge the clearance thus allowing the rider to apply power at minimum clearance A$_1$, FIG. 3, this condition representing "high gear" to the rider and has the least step-down from slip and therefore maximum drag.

Figure 11:
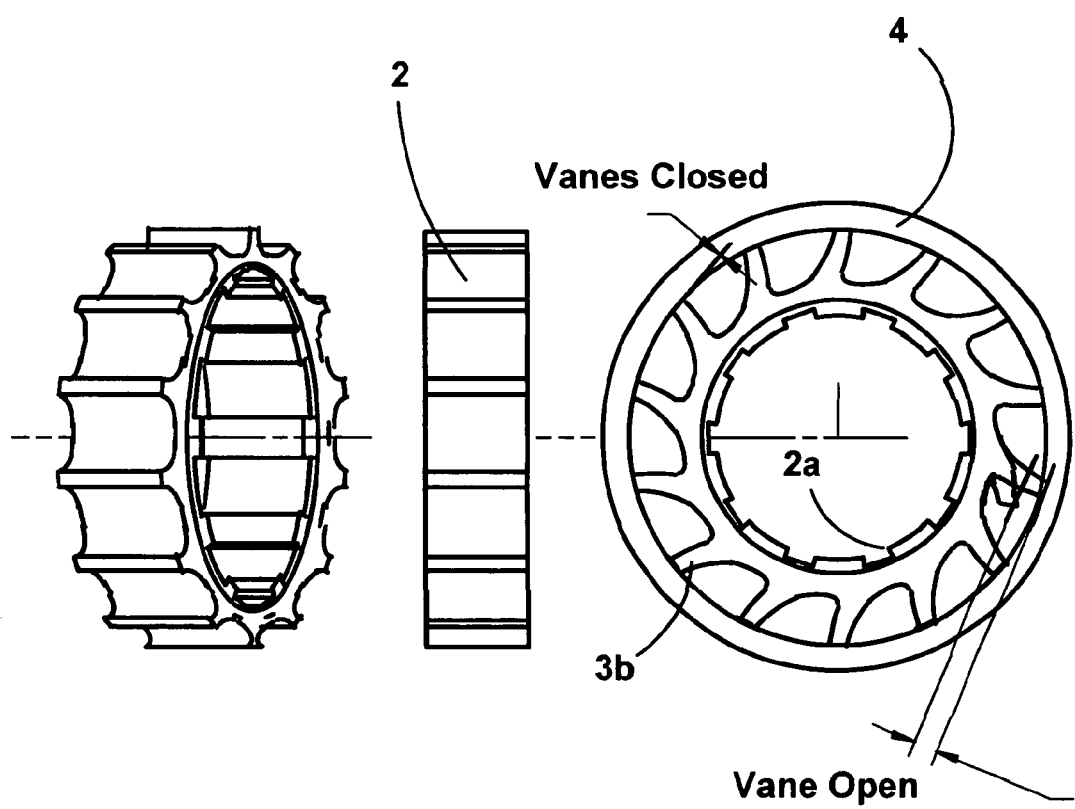
FIG. 11 presents plan, cross-sectional and isometric views of a composite vane stator.
Figure 12:
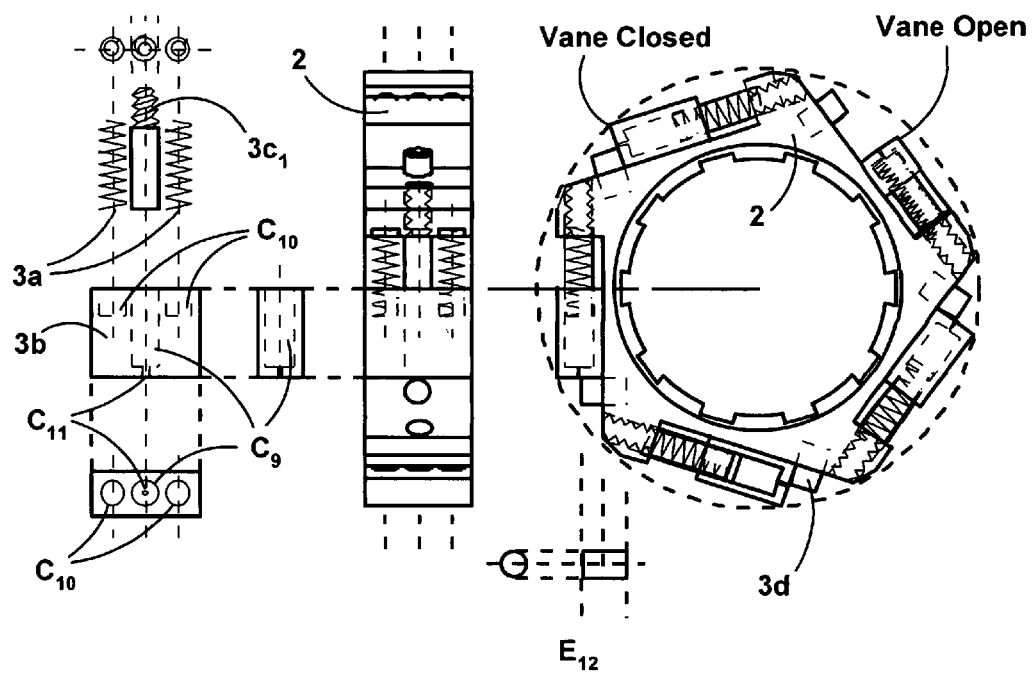
FIG. 12 presents plan, cross-sectional and isometric views of a mechanical vane stator.

The clearance enlarges from this minimum, B$_1$, to a maximum, B$_2$, as drag increases from increased flow velocity and further compresses the composite vane FIG. 11, or vane springs 3*a*, FIG. 12, this slip increasing to a maximum clearance labeled Vane Open, where minimum drag is attained thus changing the mechanical advantage from "high gear" to "low gear" in the varying of the clearance. The condition of "low gear" for this type of device is the maximum slip allowed by shear under full power within the fluid chamber between the two shells due to clearances among the stator parts and their surfaces to the outer shell and drag from complex turbulent flow comprising essentially a fixed-ratio fluid couple with all vanes are fully open, else the transmission would require a cadence too high for a human rider to transfer power in a practical manner up a steep hill, said fluid couple quantitatively affected by fluid viscosity to adjust performance over a wide range from a single transmission without changing parts clearances.

Said vane assembly, 3*a*–*d*, FIG. 12 or the composite materials of the vane itself can embody dampening functionality in response to changes in applied torque, else the vanes can react immediately to changes thus allowing the mechanical advantage to change from "high" to "low" and back to "high" during every stroke of the petals, this condition not preventing the device from transferring power. In said mechanical stator, dampening is accomplished by the structural piston 3*c*$_1$, having a small port in the vane C$_{11}$, connected to the cylinder C$_9$, in which the piston moves, these parts being immersed within the fluid chamber such motion causes said fluid to be pumped through said small port slowing vane travel velocity, this system adjusted by changing the port size and/or viscosity of the fluid to perform appropriate to the rider group.

Said vane 3*b*, and vane assembly 3*a*, 3*c*, 3*d*, attached to said stator body 2, having splines or other structural means for attachment to said inner shell 1, FIG. 4, drag from fluid flow within the closed fluid system transferring power from said outer shell to said stator that is intimately connected to said freewheeling body and hub, causing said bicycle wheel to accelerate the rider forward, and wherein mechanical advantage is changed by applied torque to move the ratio from "high gear" to "low gear" within typical ranges for the type of vehicle automatically in a manner the rider considers normal operation over varied terrain.

What is claimed is:

1. A hub for a bicycle having a hub body, rim support, and an automatic fluid transmission;

the transmission comprising:
 a. a cylindrical outer shell having a sprocket as a rotational power input means for said bicycle and having flanges for sealing, and having bearings slip fit within seats to support said transmission at each end of said cylindrical outer shell;
 b. a stator having means for varying drag as input power varies and further having means for regulating or dampening said drag variation;
 c. an inner shell having said stator a fixed centrally between said flanges of said outer shell and said stator,
 d. a sealing means for sealing the area between the stator, outer and inner shell, that once assemble will create a fluid chamber;
 e. a fluid filling means for filling the fluid in the fluid chamber, wherein said fluid chamber is filled with appropriate fluid having power transfer ability,
 f. said transmission operatively attached to a freewheel body via said hub body.

2. A bicycle hub of claim 1, wherein said freewheel body is integrally form to said inner shell and attached to said hub body.

3. A bicycle hub of claim 1, wherein said freewheel body is internal to said hub body and acting as outer shell so as to apply power using fluid to transfer power to said hub body.

4. A bicycle hub of claim 1, wherein the inner shell receives power input from said outer shell.

5. A bicycle hub of claim 1, wherein the drag varying means for varying the drag.

* * * * *